United States Patent [19]

Reber

[11] Patent Number: 4,591,353

[45] Date of Patent: May 27, 1986

[54] LINK BELT FOR AN INFINITELY VARIABLE TRANSMISSION INCLUDING CONE DISKS LOOPED BY A FLEXIBLE BELT

[76] Inventor: Reinhold F. Reber, 1120 E. Shore Dr., Ithaca, N.Y. 14850

[21] Appl. No.: 671,630

[22] Filed: Nov. 15, 1984

[30] Foreign Application Priority Data

Nov. 15, 1983 [CH] Switzerland .......................... 6163/83

[51] Int. Cl.$^4$ .............................................. F16G 1/21
[52] U.S. Cl. ...................................... 474/245; 474/242
[58] Field of Search ................ 474/245, 242, 201, 244

[56] References Cited

U.S. PATENT DOCUMENTS

| | | | |
|---|---|---|---|
| 375,040 | 12/1887 | Young | 474/245 |
| 1,114,850 | 10/1914 | Bohlman | 474/245 X |
| 1,151,587 | 8/1915 | Hess | 474/245 X |
| 2,177,410 | 10/1939 | Jepson | 474/245 |
| 4,349,343 | 9/1982 | Stephanoff et al. | 474/245 |

FOREIGN PATENT DOCUMENTS

| | | | |
|---|---|---|---|
| 566773 | 9/1957 | Italy | 474/245 |
| 2537 | of 1914 | United Kingdom | 474/245 |

Primary Examiner—James A. Leppink
Assistant Examiner—Frank McKenzie
Attorney, Agent, or Firm—Keil & Weinkauf

[57] ABSTRACT

Every link member is composed of individual link member disks having designs different from each other. All link member disks have tongues and projections projecting above these tongues, which projections comprise thrust surfaces. The link member disks of every link member abut each other via these thrust surfaces and the two outermost link member disks of every link member are intended to abut via their thrust surfaces the conically extending surfaces of the driving disks of an infinitely variable transmission having disks looped by a flexible belt. The link member disks of every link member have different thicknesses viewed in the direction of the pivot pins which penetrate the tongues. The succession of the various link member disks of every link member can be varied at each link member such that it is possible to assemble a link belt such that it produces in operation extremely small noise in consideration of the prevailing operational conditions such as speed, power transmitted, distance between the two driving disks, etc.

16 Claims, 6 Drawing Figures

LINK BELT FOR AN INFINITELY VARIABLE TRANSMISSION INCLUDING CONE DISKS LOOPED BY A FLEXIBLE BELT

BACKGROUND OF THE INVENTION

1. Field of the Invention

The present invention relates to a link belt for an infinitely variable transmission including cone disks looped by a flexible belt, which link belt is provided with a plurality of link members and a plurality of pivot pins which pivotably interconnect adjacent link members, and is provided further with thrust surfaces located intermediate of respective pivot pins and operative to transmit frictional forces.

2. Description of the Prior Art

The German patent specification DE-PS No. 1 119 065 discloses specifically in FIG. 2 thereof a link belt, which comprises special thrust members for transmitting of the frictional forces from the cone disks onto the link belt. This link belt is rather noisy in operation and it is an object to provide an improved design of such a link belt which generates in operation little noise. A further link belt is disclosed in the U.S. Pat. No. 2,475,264, which link belt has, however, a design which is not suitable for an application in an infinitely variable transmission including cone disks because an only limited thrust pressure can be exerted onto its thrust surfaces. This link belt is designed as a roller-belt of which the thrust surfaces are located on webs extending laterally relative to the belt, which webs project freely away from the roller-chain such that in case of an application of large forces onto the thrust surfaces the webs will be pressed onto the roller-chain. Accordingly, the transmittal of the forces from the thrust surfaces of this known link belt will not proceed directly over the link members but rather via the angled thrust surfaces of the webs.

SUMMARY OF THE INVENTION

It is, therefore, an object of the invention to provide a link belt for an infinitely variable transmission incorporating a direct transmittal of forces at the link members such that an extremely high force may be exerted onto its thrust surfaces without running the risk of a damaging thereof and which link belt incorporates, furthermore, a low-noise operation.

A further object of the invention is to provide a link belt in which each link member mounted to two adjacent pivot pins comprises a plurality of link member disks, each provided with tongues having through bores in which the pivot pins are received, and comprises further at least one anvil-shaped projection arranged between the through bores and which projects away from the plane of the disk and includes one of the thrust surfaces.

Because the extent of the projection (height, thickness of projection) varies, link member disks of varying thickness (width) are provided. The diversely thick link member disks can be arranged accordingly on the corresponding pivot pin in variable arrangement relative to each other. The adjacent link member can be provided with an arrangement of link member disks which differ therefrom. There are so to speak two degrees of freedom with regard to the design for arrangement of a given link belt, namely a first degree regarding the individual, respective composition of a link member based on various link member disks, and a second degree with regard to the arbitrary joining of adjacent individually and differently arranged link members in the entire link belt.

BRIEF DESCRIPTION OF THE DRAWINGS

The present invention will be more fully understood by reference to the following detailed description thereof, when read in conjunction with the attached drawings, and wherein.

DETAILED DESCRIPTION OF THE PREFERRED EMBODIMENTS

Figure 1:
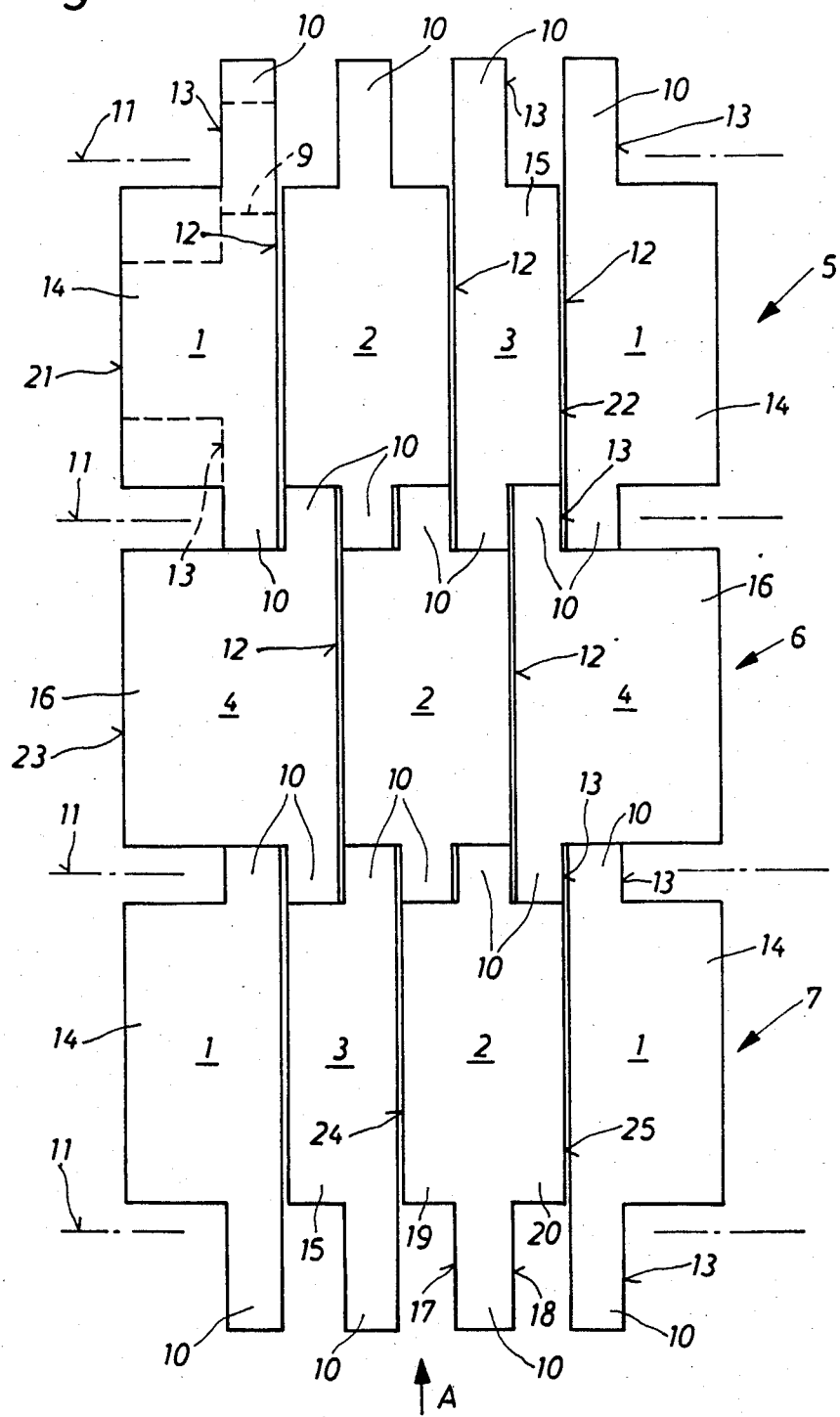
FIG. 1 illustrates a top view of three adjacent link members of a link belt.

The link belt illustrated in FIGS. 1–4 is provided with four individually differing link member disks 1, 2, 3, 4. The section of the link belt illustrated in FIGS. 1 and 4 has three link members identified by 5, 6 and 7. The link member 5 is set together of four link member disks, namely two link member disks 1, a link member disk 2 and a link member disk 3. The link member 6 is composed of only three link member disks, namely two link member disks 4 and one link member disk 2. The link member 7 is composed in turn of four link member disks, namely again two link member disks 1, a link member disk 2 and a link member disk 3. The difference between the link members 5 and 7 is accordingly merely due to a different arrangement of their link member disks.

The link members 5, 6 and 7 are pivotably joined to each other by means of pivot pins 8. These pivot pins 8 are inserted in through bores 9 arranged in tongues 10 formed in the link member disks 1,2,3 and 4. For the sake of clarity FIG. 1 depicts only one through bore 9 of the tongues 10 and the pivot pins 8 extending through the through bores 9 are not particularly illustrated. However, the centre lines 11 of the through bores 9 and pivot pins 8, respectively, are designed, which centre lines determine the chain pitch of the link belt.

The link member disks of a link member can be divided into first link member disks 1, 3, 4 and second link member disks 2. The first link member disks 1, 3 and 4 comprise specificly a planar back surface 12 extending over the complete link member disk. Furthermore, the first link member disks 1, 3 and 4 have a planar front surface 13 extending only over the area of the tongues 10 and an anvil-shaped projection 14, 15 or 16, respectively, projects above the mentioned planar front surface 13. The difference between the projections 14, 15 and 16 is their individual extent, i.e. the distance by which they project above the front surface 13. According to the illustrated embodiment the link member disk 3 has accordingly the shortest projection 15 and the link member disk 4 features the longest projection 16.

The second link member disks 2 comprise two tongue surfaces 17 and 18 extending parallel relative to each other and two anvil-shaped projections 19 and 20 are provided which project above the respective tongue surface 17 and 18, respectively.

Accordingly, each link member disk 1,2,3,4 is provided with two tongues 10 and each tongue 10 comprises two surfaces 12, 13 and 17, 18, respectively, extending parallel to each other. By means of these parallel surfaces 12 and 13 or 17 and 18, respectively, it is possible to define at every link member disk a link member disk surface from which one or two, respectively, anvil-shaped projections 14, 15, 16 or 19, 20, respectively, project.

Figure 2:
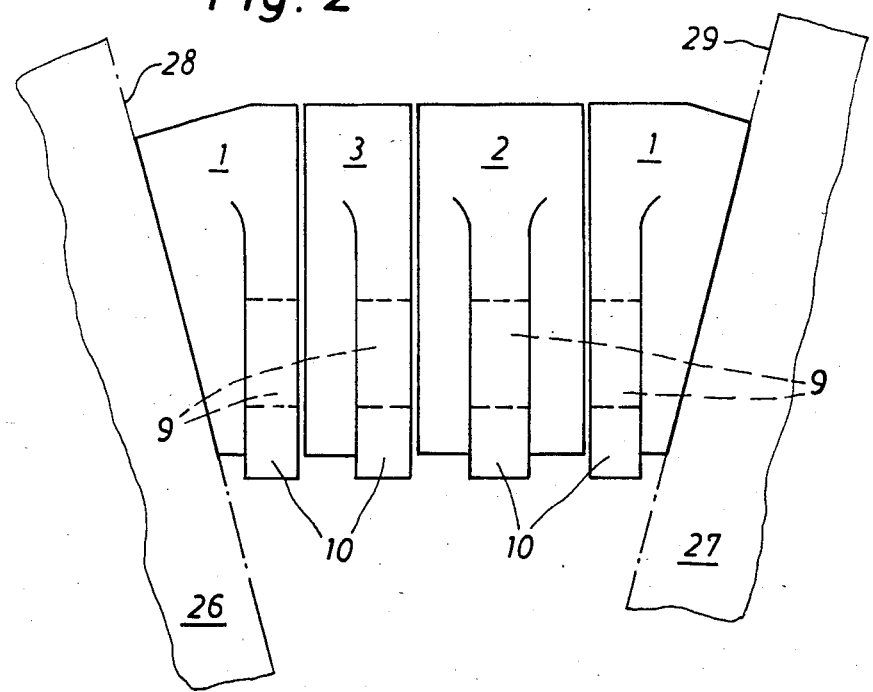
FIG. 2 illustrates a face view of the link members viewed in the direction of the arrow A in FIG. 1.
Figure 3:
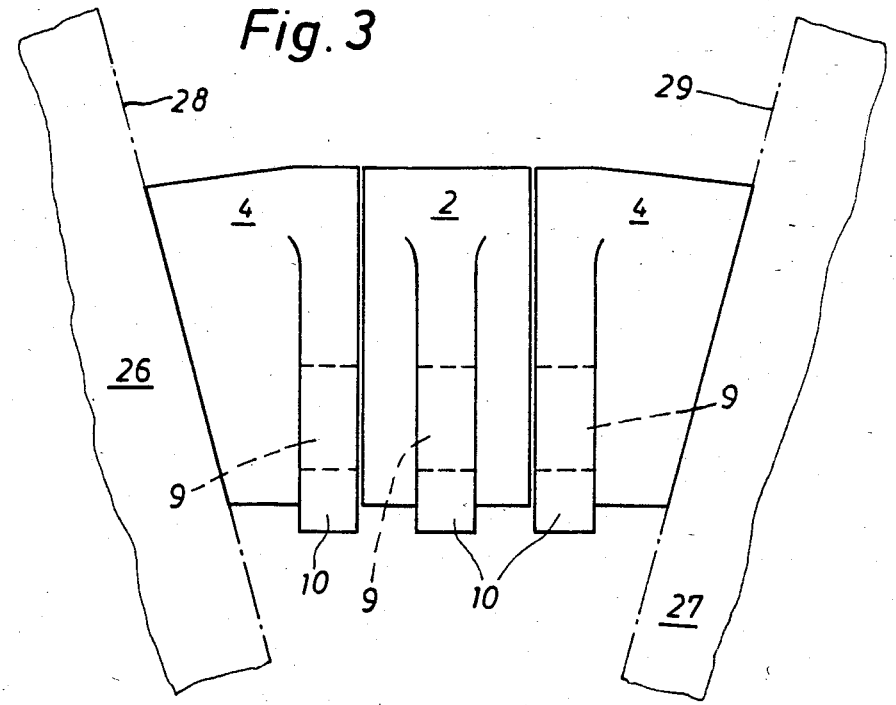
FIG. 3 illustrates a face view of the middle link member of FIG. 1.
Figure 4:
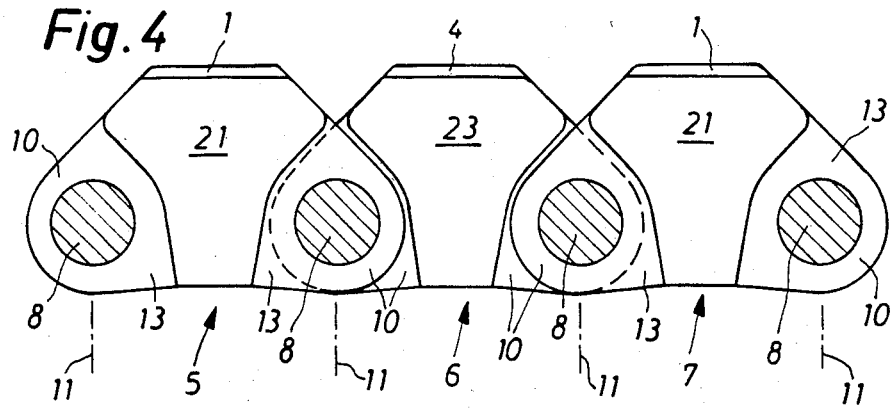
FIG. 4 illustrates a side view of the three link members represented in FIG. 1.

Each projection 14, 15, 16, 19 and 20 forms by means of its free face surface a thrust surface 21,22, 23,24 and 25 serving for the transmission of the frictional forces. Accordingly, every link member disk 1 comprises one projection 14 which comprises in turn a thrust surface 21. Every link member disk 2 has two projections 19 and 20 and the projection 19 comprises the thrust surface 24, and the projection 20 comprises the thrust surface 25. Every link member disk 3 has a projection 15 comprising a thrust surface 22 and every link member disk 4 has a projection 16 comprising a thrust surface 23. The thrust surfaces 24 and 25 of every link member disk 2 extend parallel to each other and also parallel to their tongue surfaces 17 and 18. The same is true for every link member disk 3, i.e. the thrust surface 22 extends parallel to the back surface 12 as well as to the front surface 13. The situation is different at the link member disks 1 and 4 because these disks are intended to abut at their thrust surfaces 21 and 23 the cone disks 26 and 27 of an infinitely variable transmission which is provided with cone disks looped by a flexible belt such as illustrated in FIGS. 2 and 3. Accordingly, the link member disks 1 and 4 of this link belt are located at the outermost position and, therefore, will abut the cone disks 26 and 27 (FIGS. 2, 3). For this reason the thrust surfaces 21 and 23 of the link member disks 1 and 4 extend obliquely relative to the front surface 13 and to the back surface 12 and, moreover, their inclination corresponds to the inclination of the conical surfaces 28 and 29 of the driving disks 26 and 27.

The interstice designed in FIGS. 1, 2 and 3 between adjoining link member disks has been designed only for the sake of clarity. In the practical embodiment adjoining link member disks of a respective link member 5, 6 or 7 abut and contact each other, i.e. the cone disks 26 and 27 acting as driving disks press the individual link member disks of a respective link member together such that they act as integral block.

FIG. 1 discloses that the link member 5 comprises four tongues 10, which rest on a pivot pin 8. The same proves true for the link member 7. The link member 6 located therebetween comprises only three tongues 10 resting on a pivot pin 8. The dimension of the projections 14, 15, 16, 19 and 20 is chosen such that it exceeds the thickness of the tongues 10 such that accordingly adjoining link members will not be pressed against each other in the area of their tongues 10 such that adjoining link members can carry out the pivoting movements around pivot pin 8 located therebetween. Conclusively, the link member disks of every link member are pressed and urged together only within the area of their projections 14, 15, 16, 19 and 20 and their thrust surfaces 21 to 25.

FIG. 1 illustrates that every pivot pin 8 (having the center axis 11) supports first and second link member disks. The link member 5 has first link member disks 1 and 3 and further one of the second link member disks 2. The link member 5 has two first link member disks 4 and one of the second link member disks 2. The link member 7 is composed of the same link member disks as is the case of the link member 5, however including a different arrangement of the link member disks 2 and 3. FIG. 1 illustrates that based on the top view of the link belt the link member disks 2 of adjoining link members are located staggered relative to each other. The link member disks 3 of the two link members 5 and 7 are also staggered relative to each other when viewed in the mentioned top view.

According to one embodiment of the link belt, which corresponds about to the design shown in FIG. 1, the extent of the projection 15 of the link member disk 3 is only a little larger than the thickness of the tongue 10. The extent of the projection 14 of the link member disk 1 is double of the extent of the projection 15, it thus projects twice as much over the front surface 13. The extent of the projection 16 of the link member disk 4 is thrice the extent of the projection 15, thus projects above its front surface 13 three times as much. Because the tongues 10 of all link member disks have the same thickness, it follows that the total thickness of the link member disk 1 in the illustration according to FIG. 1 is 50% larger than the total thickness of the link member disk 3. The total thickness of the link member disk 4, seen in the illustration of FIG. 1, is again 50% larger than the total thickness of the link member disk 1.

FIG. 1 discloses further that the projections 14, 15, 16, 19 and 20 of all link member disks 1 to 4 supported on two adjoining pivot pins 8 (extending in the direction of the axis 11) are located in registry in the direction perpendicularly to the longitudinal extent of the link belt.

Figure 5:
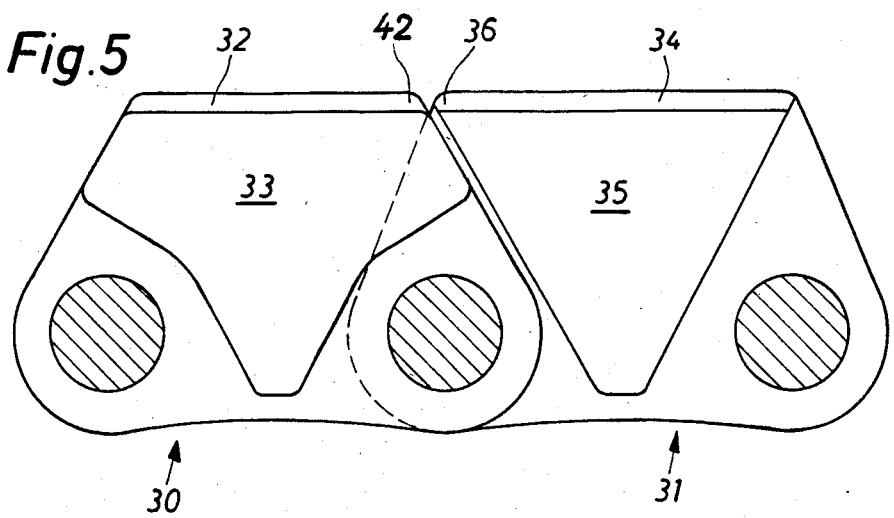
FIG. 5 illustrates a second embodiment of the link belt, whereby two different link members are shown.

FIG. 5 illustrates a second embodiment of the link belt and illustrates in particular two link members 30 and 31 differing from each other. Hereby the link member 30 has a link member disk 32 incorporating a thrust surface 33 having a shape which differs from the shape of the thrust surfaces 21 and 23 according to FIG. 4. In this connection attention is drawn to the fact that according to the first embodiment illustrated in FIGS. 1-4 the thrust surfaces 22, 24 and 25 have also the same shape as the thrust surfaces 21 and 23 illustrated in FIG. 4. The link member disk 34 of the link member 31 illustrated in FIG. 5 is provided with a thrust surface 35, which deviates considerably from the shape of the thrust surface 33. Accordingly, it is also possible to form a link belt of which adjoining link members have thrust surfaces of differing designs. It is however, due to several reasons, advisable to provide all link member disks of a link member with the same form of their thrust surfaces. The adjoining link members 30 and 31 illustrated in FIG. 5 have, however, a further peculiarity in that their link member disks 32 and 34 have an only small distance from each other at their upper edges 42 and 36. This allows a bending of the link belt in one direction only such that in several applications improved operating features of the link belt are achieved.

Figure 6:
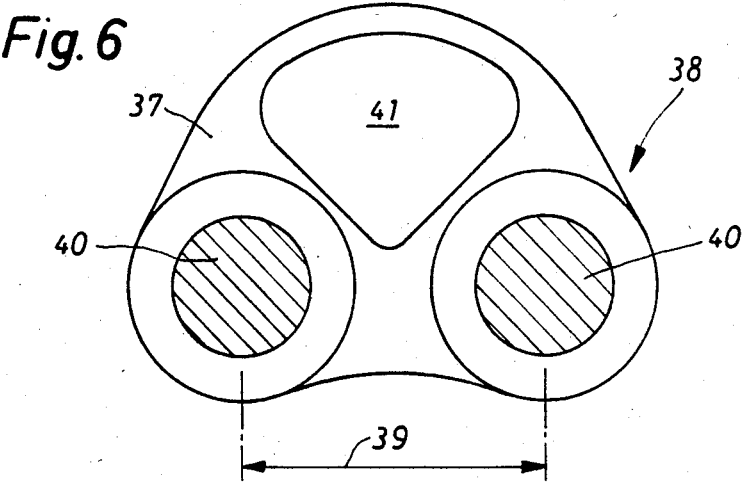
FIG. 6 illustrates a third embodiment of the link belt showing one link belt member only.

A third embodiment of the link belt, which is illustrated in FIG. 6, shows only one link member disk 37 of a link member 38 whereby the object is to achieve a as small as possible chain pitch 39. Accordingly, the distance between adjoining pivot pins 40 is kept as small as possible. The shape of the thrust surface 41 differs also from the other illustrated thrust surfaces 21-25, 33 and 35.

The link members of the illustrated inventive link belt abut themselves directly the cone disks (driving disks) of the infinitely variable transmission and not by the intermediary of separate thrust members or pivot pins such as is the case of known link belts. The link member disks of a link member supported on adjoining pivot pins are provided with thrust surfaces which can be designed relatively large such that the specific pressure per unit area can be held relatively at a small value. The link member disks of a link member abut or contact, respectively, each other merely at their thrust surfaces such that the tongues of the disks are not subjected to such forces following in that the link belt is of an easy motion. In order to prevent oscillations the arrangement of the link member disks of a link member can be variously altered along the extent of the link belt. Also the link member disks of a link member can be produced from various materials, i.e. it is possible to have adjoining link member disks in a link member of predetermined differing materials. If the link member disks of a link member move between the cone disks 26 and 27 of such a transmission, the link member disks of each link member 5, 6 or 7 are blocked against each other in a frictionally engaged position such that the link belt acting as integral block abuts via its thrust surfaces 21 and 23 the surfaces 28 and 29 of the cone disks 26 and 27.

The inventive link belt can be used for instance in an automatic transmission of motor vehicles. The quietness of the running link belt in such transmissions has been up till now a big problem. Until now noise has been generated in operation which was due to the continuously equal motion of a link belt of an invariable design. Due to the motions of known link belts, which motions remain continuously the same in operation, oscillations are produced which in turn give rise to disturbing noise. By means of the unsymmetrical arrangements of the link member disks (see link members 5 and 7 in FIG. 1) in the inventive link belt, it is possible to counteract the natural vibrations or oscillations of the individual link member disks. This can be supported further by the lateral staggering of link member disks of the same design such as illustrated in FIG. 1 by means of the link member disks 2. The mentioned choosing of various materials for the link member disks can add further to the quietness of operation achievable. It is also possible to produce by empirical assembling of the various link member disks to a link member and by arranging of correspondingly assembled adjoining link members a link belt which corresponds optimally to the respective conditions of the operation such to have an extremely quiet operation. Such conditions of the operation can be for instance the speed of the link belt, the power transmitted therewith, the distance between the two pairs of cone disks between which the link belt operates, the torque which can be transmitted, the fundamental (natural) frequency of the individual structural members of the automatic transmission, the motor characteristics, etc.

It is obviously also possible to join link members in a chosen succession having various chain pitches. This is, accordingly, a further freedom regarding the empirical arrangement and assembling of the link members to a link belt.

According a not particularly illustrated modification of the link belt it is possible to use none of the first link member disks described in claim 2 such that only second link member disks according to claim 4 are present.

In such modification the link member disks 1 and 4 are altered such that they comprise an anvil-shaped projection on their back surface 12, which projection would have a height which is half as large as such of the projections 15, 19 or 20 illustrated in FIG. 1. The link member disks 2 are then changed such that their projections 19 and 20 have the same height only. In such case it is possible to do away completely with the link member disks 3.

While there are shown and described present preferred embodiments of the invention, it is to be distinctly understood that the invention is not limited thereto, but may be otherwise variously embodied and practiced within the scope of the following claims.

I claim:

1. A link belt for an infinitely variable transmission including cone disks looped by a flexible belt, which link belt is provided with a plurality of link members and a plurality of pivot pins which pivotably interconnect adjacent link members, and is provided further with thrust surfaces located intermediate of respective pivot pins and operative to transmit frictional forces, in which each link member mounted to two adjacent pivot pins comprises a plurality of link member disks, each provided with tongues having through bores in which the pivot pins are received, and comprises further at least one anvil-shaped projection arranged between said through bores and which projects away from the plane of the disk and includes one of said thrust surfaces.

2. The link belt of claim 1 comprising first link member disks, each provided with a planar back surface extending over the complete link member disk, and provided further with a planar front surface extending only above the area of said tongues, and therein one respective anvil-shaped projection projects above said front surface.

3. The link belt of claim 2, in which the thrust surface of the anvil-shaped projection of individual link member disks extends obliquely relative to the front surface and relative to the back surface, which thrust surface is intended to abut the conical surfaces of driving disks of an infinitely variable link belt transmission.

4. The link belt of claim 1, comprising second link member disks, each provided with two parallel tongue surfaces, wherein each anvil-shaped projection projects above each tongue surface, and which two thrust surfaces of the two projections extend parallel to each other.

5. The link belt of claim 2, comprising first link member disks of which the extent of the projection is larger than such of other first link member disks.

6. The link belt of claim 1, wherein each pivot pin mounts first and second link member disks, each first link member disk is provided with a planar back surface extending over the complete link member disk, and is provided further with a planar front surface extending only the area of said tongues, and wherein one respective anvil-shaped projection projects over said front surface, each second link member disk is provided with parallel tongue surfaces, wherein one respective anvil-shaped projection projects over each tongue surface and the two thrust surfaces of the two projections extend parallel to each other.

7. The link belt of claim 5, comprising first link member disks having an extent as measured between the back surface and the thrust surface arranged at the tongue which is 50% larger than other first link member disks.

8. The link belt of claim 1, wherein the extent of the projection is larger than the thickness of a disk tongue.

9. The link belt of claim 1, wherein the projections of all link member disks mounted to two adjacent pivot pins are located in registry in the direction perpendicularly to the longitudinal extent of the belt.

10. The link belt of claim 1, comprising first link member disks of which the back surface and the thrust surface present on the projection extend parallel to each other.

11. A link belt for an infinitely variable transmission including cone disks looped by a flexible belt, which link belt is provided with a plurality of link members and a plurality of pivot pins which pivotably interconnect adjacent link members and is provided further with thrust surfaces located intermediate of respective pivot pins and operative to transmit frictional forces, in which each link member mounted to two adjacent pivot pins comprises first and second link member disks, each provided with tongues having through bores in which the pivot pins are received, each first link member disk having a planar back surface extending over the complete link member disk and having further a planar front surface extending only above the area of said tongues, and having one anvil-shaped projection projecting away from the plane of the disk and above said front surface and arranged between said through bores and including one of said thrust surfaces; each second link member disk having two parallel tongue surfaces and two anvil-shaped projections, each projecting above one of the tongue surfaces, the two thrust surfaces of the two projections extending parallel to each other, the extent of the projection of a number of first link member disks being larger than such of other first link member disks.

12. The link belt of claim 11, in which the thrust surface of the anvil-shaped projection of individual link member disks extends obliquely relative to the front surface and relative to the back surface and is intended to abut the conical surfaces of driving disks of an infinitely variable link belt transmission.

13. The link belt of claim 12, comprising first link member disks having an extent as measured between the back surface and the thrust surface present at the tongue, which is 50% larger than such of other first link member disks.

14. The link belt of claim 11, wherein the extent of the projection is larger than the thickness of a disk tongue.

15. The link belt of claim 11, wherein the projections of all link member disks mounted to two adjacent pivot pins are located in registry in a direction perpendicularly to the longitudinal extent of the belt.

16. The link belt of claim 11, comprising first link member disks of which the back surface and the thrust surface present on the projection extend parallel to each other.

* * * * *